United States Patent
Sublett

(10) Patent No.: US 11,645,549 B2
(45) Date of Patent: *May 9, 2023

(54) SYSTEM FOR DERIVING DATA IN CONSTRAINED ENVIRONMENTS

(71) Applicant: Honeywell International Inc., Morris Plains, NJ (US)

(72) Inventor: John Sublett, Richmond, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/864,476

(22) Filed: May 1, 2020

(65) Prior Publication Data

US 2020/0327427 A1 Oct. 15, 2020

Related U.S. Application Data

(63) Continuation of application No. 14/697,492, filed on Apr. 27, 2015, now Pat. No. 10,643,136.

(51) Int. Cl.
*G06N 5/02* (2006.01)
*G06N 5/025* (2023.01)

(52) U.S. Cl.
CPC .................... *G06N 5/025* (2013.01)

(58) Field of Classification Search
None
See application file for complete search history.

(56) References Cited

U.S. PATENT DOCUMENTS

| 8,515,736 B1 | 8/2013 | Duta | |
|---|---|---|---|
| 8,595,245 B2 | 11/2013 | Cavestro et al. | |
| 9,081,847 B2 | 7/2015 | Dos Santos et al. | |
| 9,239,872 B2 | 1/2016 | Dos Santos et al. | |
| 2014/0244836 A1* | 8/2014 | Goel | H04W 4/08 709/224 |
| 2014/0375431 A1 | 12/2014 | Cristache | |

(Continued)

FOREIGN PATENT DOCUMENTS

WO 2016050257 A1 4/2016

OTHER PUBLICATIONS

Liu D, Wang M, Hua XS, Zhang HJ. Semi-automatic tagging of photo albums via exemplar selection and tag inference. IEEE Transactions on Multimedia. Oct. 18, 2010;13(1):82-91. (Year: 2010).*

(Continued)

*Primary Examiner* — Vincent Gonzales
(74) *Attorney, Agent, or Firm* — Seager, Tufte & Wickhem, LLP

(57) ABSTRACT

A system and approach for deriving data for a constrained environment of a controller such as, for example, an embedded device. The controller may incorporate a processor and a memory connected to the processor. The memory may have a constrained capacity. The memory may contain an extensible set of rules for deriving additional semantic information from available information at the embedded device. The processor and the memory with the extensible set of rules may constitute a semantic rule engine. The semantic rule engine may apply the extensible set of rules to the available information to derive the additional semantic information.

20 Claims, 2 Drawing Sheets

(56) References Cited

U.S. PATENT DOCUMENTS

2015/0019714 A1* 1/2015 Shaashua .............. H04W 4/023
709/224

OTHER PUBLICATIONS

Evans, David, and David M. Eyers. "Efficient data tagging for managing privacy in the internet of things." 2012 IEEE International Conference on Green Computing and Communications. IEEE, 2012. (Year: 2012).*

Chun, Sejin, et al. "Semantic description, discovery and integration for the Internet of Things." Proceedings of the 2015 IEEE 9th International Conference on Semantic Computing (IEEE ICSC 2015). IEEE, 2015. (Year: 2015).*

W. Zhang and K.M. Hansen, "An OWL/SWRL based diagnosis approach in a pervasive middleware", 20th Int'l Conf. on Software Eng. and Knowledge Eng., 2008, 6 pages, (Year: 2008).

* cited by examiner

SYSTEM FOR DERIVING DATA IN CONSTRAINED ENVIRONMENTS

The present application is a continuation of U.S. patent application Ser. No. 14/697,492, filed Apr. 27, 2015, entitled, "System for Deriving Data in Constrained Environments." U.S. patent application Ser. No. 14/697,492, filed Apr. 27, 2015, entitled, "System for Deriving Data in Constrained Environments" is hereby incorporated by reference.

BACKGROUND

The present disclosure pertains to devices with constrained environments and in particular to approaches to derive information in the environments.

SUMMARY

The disclosure reveals a system and approach for deriving data for a constrained environment of a controller such as, for example, an embedded device. The controller may incorporate a processor and a memory connected to the processor. The memory may have a constrained capacity. The memory may contain an extensible set of rules for deriving additional semantic information from available information at the embedded device. The processor and the memory with the extensible set of rules may constitute a semantic rule engine. The semantic rule engine may apply the extensible set of rules to the available information to derive the additional semantic information.

DESCRIPTION

Figure 1:
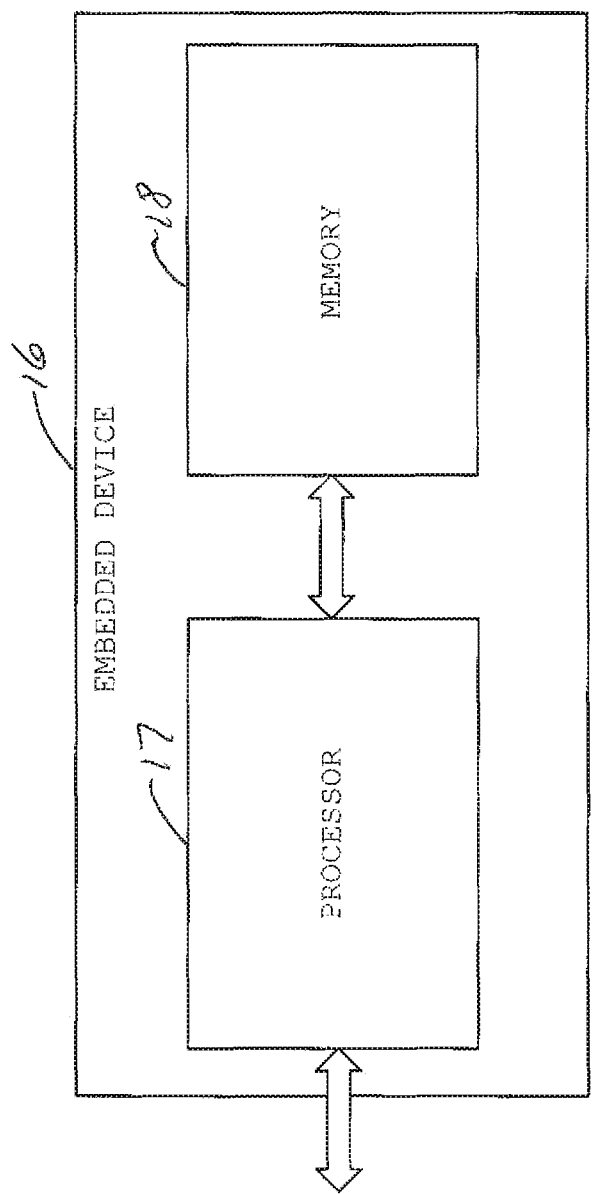
FIG. 1 is a diagram of an embedded device relating to the present system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Embedded devices may typically have constrained system resources such as RAM and persistent storage. To achieve easier deployment for high value applications that use device data, systems should have much more semantic information available about devices, device data, and relationships between devices. Resource constraints in embedded devices may severely limit how much semantic information can be stored directly in the devices.

In many cases, information that already exists in the devices (e.g., names, identifications (ID's), programming, and configurations) may be used to derive other valuable semantic information that can be used for applications in the device itself or passed upward in another system for use in higher level applications. A feature of the present system and approach may be an extensible system of rules for deriving semantic information from other information. Rather than storing the semantic tags and relationships on each object, a set of rules may be used or evaluated on demand to determine the semantic data for each object. The rules may be based on name matching, containment, attributes, and relationships. The semantic rule engine may also allow new rules with new behaviors to be defined. The rules may be used to derive tags, attributes and relationships. This way, more information may be made available to devices such as derived information than what the memory could hold in terms of direct tags, relationships, and so on.

The present system and approach may be implemented in Niagara™ 4. By creating a typical application based on the Niagara 4 framework and adding one or more smart tag dictionaries to the application, additional tags and relationships may be present and accessible through Niagara API's and tools like search and hierarchy definitions, even though those tags and relationships do not necessarily actually exist in a persistent fashion in a data model. An API may be an application programming interface with routing, protocol and tools for building software applications.

To better enable analytics and other applications on device data, it may be beneficial to have an object model that represents the devices and incorporates meta-data about the devices including tags and relationships.

Metadata may describe other data, such as information about a certain item's content. For example, an image may include meta-data that describes how large the picture is, the color depth, the image resolution, when the image was created, and other data. A text document's metadata may contain information about how long the document is, who the author is, when the document was written, and a short summary of the document.

Tags may be marker tags which provide type information about the device (e.g., "Thermostat", "HVAC", "temperature") or value tags which provide property values (e.g., vendor="Honeywell"). A relationship may be a named association between two objects. Each tag or relationship that is defined directly on, in or by an object may consume some amount of the system memory. In a constrained embedded environment, the amount of memory required for the tags could limit the number of tags and relationships that can be used and therefore limit the value of the available meta-data to applications that need it.

The present system and approach may be a mechanism for associating tags and relationships with objects using rules rather than defining them directly on the object. Given a collection of objects defined in the system, an API may be created that allows the tags and relationships on those objects to be accessed. An implementation of the API may process a set of rules for an object to determine any derived tags or relationships, and to return a full set of tags and relationships for the object where the full set incorporates the tags and relationships defined directly on the object plus the tags and relationships derived from the rules.

A rule engine may contain a collection of rules to be used or evaluated against an object, on demand, when the tags or relationships for the object are accessed via the API. The set of rules evaluated by the rule engine may be extensible. Some examples of rules may incorporate: 1) Adding a tag or relationship based on pattern matching on the object name; 2) Adding a tag or relationship based on other tags defined directly on the object; and 3) Adding a tag or relationship based on a set of tags defined for virtually all objects in a collection.

FIG. 1 is a diagram of an embedded device 16 having a processor 17 and a memory 18 connected to processor 17.

Figure 2:
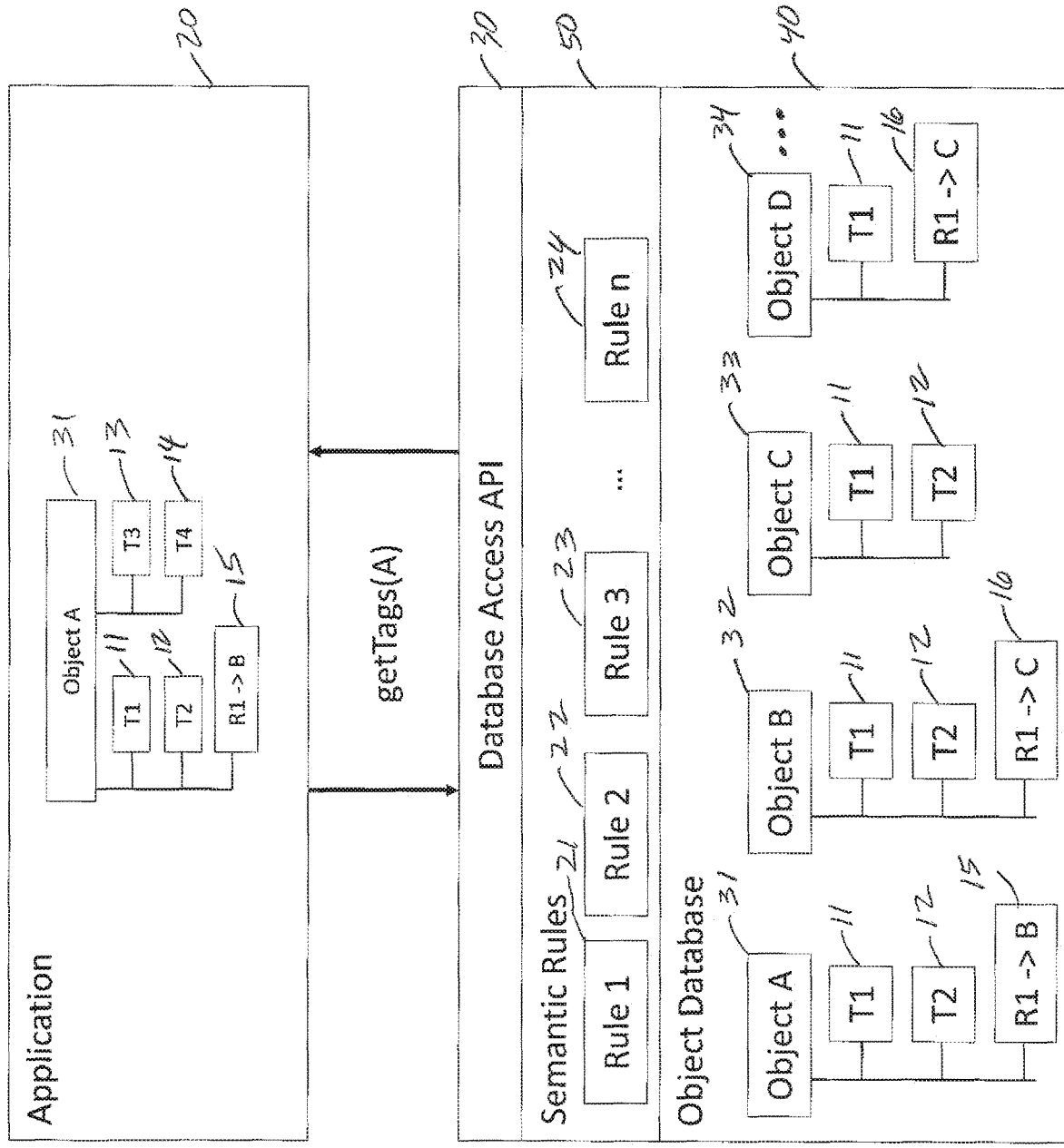
FIG. 2 is a diagram of a semantic layout of the present system and approach.

FIG. 2 is a diagram of a semantic layout of the present system and approach. An application 20 may select an object. For example, object (A) 31 and application 20 may get or receive tags (T1) 11 and (T2) 12 along with a relationship (R1→B) 15 from an object database 40. "(R1→B)" may mean that object (A) 31 has a relationship with an object (B) 32.

One or more other objects may be selected, such as object (B) 32 with tags (T1) 11 and (T2) 12 and a relationship (R1→C) 16, object (C) 33 with tags (T1) 11 and (T2) 12, object (D) 34 with tag (T1) 11 and relationship (R1→C) 16, and so forth. There may be semantic rules 50 such as rule (1) 21, rule (2) 22, rule (3) 23, and other rules up to rule (n) 24, where "n" may be a total number of rules. Tags (T3) 13 and (T4) 14 of object (A) 31 in application 20 may be derived. Relationships 15 and 16, and other possible relationships may be derived.

To recap, a mechanism for deriving data for a constrained environment, may incorporate an embedded device having a processor, and a memory connected to the processor. The memory may have a constrained capacity. The memory may contain an extensible set of rules for deriving additional semantic information from available information at the embedded device. The processor and the memory with the extensible set of rules may incorporate a semantic rule engine. The semantic rule engine may apply the extensible set of rules to the available information to derive the additional semantic information.

The memory may be between X percent of 100 percent full to Y percent of 100 percent full when holding the available information selected from a group incorporating an object database with objects having respective information incorporating tags, attributes and relationships, the extensible set of rules, an operating system, identifications, configurations, and a data programming interface for accessing the information in a useable format. X and Y may be numbers, and X=<Y.

The semantic rule engine may apply the extensible set of rules to the available information to derive the additional semantic information that can reduce available room of the memory from 100 percent full minus X percent, to 100 percent full minus Y percent.

The extensible set of rules may be based on one or more characteristics selected from a group incorporating name matching, containment, tags, attributes, and relationships.

The semantic rule engine may define new rules with new behaviors. The new rules may be used by the semantic rule engine to derive more additional semantic information. The more additional semantic rule information may be storable in the memory as long as the available room in the memory is less than 100 percent full.

An application programming interface, and search and hierarchy definition tools may access additional tags and relationships from information of a data model developed by the semantic rule engine.

An approach for deriving a semantic data model within a constrained environment, may incorporate connecting a microprocessor to a memory to form an embedded device. The memory may have a limited capacity for information. The memory may contain an extensible set of rules for deriving semantic information from a certain amount information in the memory. The extensible set of rules may be applied to the certain amount of information in the memory of the device to derive additional semantic information from the certain amount of information.

The processor and memory with the extensible set of rules may constitute a semantic rule engine.

The semantic rule engine may permit new rules with defined behaviors to be added to the set of extensible rules. The rules may be used to derive tags, attributes and relationships.

The approach may further incorporate accessing additional tags and relationships from information of a data model developed by the semantic rule engine, with an application programming interface, and search and hierarchy definition tools.

The extensible set of rules may be based on one or more characteristics selected from a group incorporating name matching, containment, attributes, and relationships.

One or more rules of the extensible set of rules may be selected from a group incorporating adding a tag or relationship based on pattern matching on an object name, adding a tag or relationship based on other tags defined directly on the object, and adding a tag or relationship based on a set of tags defined for virtually all objects in a collection.

A system for developing additional information from existing information within a constrained environment, may incorporate an embedded device having a processor, and a memory having a constrained capacity for a certain amount of semantic information. The memory may contain an extensible set of rules for deriving semantic information from the certain amount of information. The extensible set of rules may be applied by a semantic rule engine to the certain amount of information in the memory of the device to derive additional semantic information from the certain amount of information.

The semantic rule engine may incorporate components of the processor. The semantic rule engine may use the extensible set of rules to derive tags, attributes and relationships. The semantic rule engine may derive additional rules having new behaviors.

Components of the processor and portions of the memory may incorporate an application programming interface, and search and hierarchy definition tools that can derive additional tags and relationships from information of a data model developed by the semantic rule engine.

One or more rules of the extensible set of rules can be selected from a group incorporating adding a tag or relationship based on pattern matching on an object name, adding a tag or relationship based on other tags defined directly on the object, and adding a tag or relationship based on a set of tags defined for virtually all objects in a collection.

The extensible set of rules may be based on one or more characteristics selected from a group incorporating name matching, containment, attributes, and relationships.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for deriving device information, the method comprising:
   receiving a request from an application to derive the device information corresponding to a device from amongst a plurality of devices in a facility;
   retrieving at least one of: a first tag of a plurality of tags associated with the device, a first attribute of a plurality of attributes associated with the device, and a first relationship of a plurality of relationships associated with the device, wherein the first tag, the first attribute, and the first relationship corresponds to a first information accessible by the application;
   applying, by the application, a plurality of rules associated with the device to the at least one of: the first tag, the first attribute, and the first relationship, wherein each rule of the plurality of rules defines a condition to relate at least one tag of the plurality of tags with at least one relationship of the plurality of relationships;
   determining, by the application, the device information associated with the device, wherein the device information comprises at least one of:
      a second tag different from the first tag, a second attribute different from the first attribute, and a second relationship different from the first relationship derived based on the plurality of rules to applied to the first tag, the first attribute, and the first relationship, and wherein the device information is not accessible by the application and is derived from the first information; and
   executing, by the application, one or more operations to control the plurality of devices in the facility.

2. The method of claim 1, further comprises publishing the second tag for reception by the application.

3. The method of claim 1, further comprising:
   accessing the plurality of tags, the plurality of attributes, and the plurality of relationships via the application and a search and hierarchy definition tools in response to the request from the application; and
   transmitting the device information to a higher application at a higher level than the application in a hierarchy.

4. The method of claim 1, wherein determining the device information associated with the device comprises:
   evaluating the first tag and the first attribute based on the first relationship and the plurality of rules to determine the second tag, the second attribute, and the second relationship.

5. The method of claim 1, further comprising:
   determining a new set of rules different from the plurality of rules, wherein the new set of rules are determined in response to determining that a memory of the device has space to store the new set of rules.

6. The method of claim 1, further comprising:
   determining each rule of the plurality of rules based on at least one of: a name matching, a containment, an attribute, and a relationship associated with the device.

7. The method of claim 1, wherein retrieving at least one of: the first tag, the first attribute, and the first relationship comprises:
   selecting the at least one of: the first tag, the first attribute, and the first relationship from an object model of the device, wherein the object model comprises a plurality of objects, and wherein each object of the plurality of objects comprises an associated tag of the plurality of tags and an associated relationship of the plurality of relationships.

8. The method of claim 7, wherein applying the plurality of rules to the at least one of: the first tag, the first attribute, and the first relationship comprises:
   adding at least one of a third tag and a third relationship based on a pattern matching on an object name;
   adding at least one of a fourth tag and a fourth relationship based on other tags defined directly on an object; and
   adding at least one of a fifth tag and a fifth relationship based on a set of tags defined virtually for all objects in the object model.

9. A non-transitory computer-readable medium containing instructions that, when executed by a processor performs:
   receive a request from an application to derive device information corresponding to a device from amongst a plurality of devices in a facility;
   retrieve at least one of: a first tag of a plurality of tags associated with the device, a first attribute of a plurality of attributes associated with the device, and a first relationship of a plurality of relationships associated with the device, wherein the first tag, the first attribute, and the first relationship corresponds to a first information accessible by the application;
   apply, by the application, a plurality of rules associated with the device to the at least one of: the first tag, the first attribute, and the first relationship, wherein each rule of the plurality of rules defines a condition to relate at least one tag of the plurality of tags with at least one relationship of the plurality of relationships;
   determine, by the application, the device information associated with the device, wherein the device information comprises at least one of:
      a second tag different from the first tag, a second attribute different from the first attribute, and a second relationship different from the first relationship derived based on the plurality of rules to applied to the first tag, the first attribute, and the first relationship, and wherein the device information is not accessible by the application and is derived from the first information; and
   execute, by the application, one or more operations to control the plurality of devices in the facility.

10. The non-transitory computer-readable medium of claim 9, wherein the application is configured to:
    access the plurality of tags, the plurality of attributes, and the plurality of relationships in response to the request; and
    transmit the device information to a higher application at a higher level than the application in a hierarchy.

11. The non-transitory computer-readable medium of claim 9, wherein the application is configured to:
    evaluate the first tag and the first attribute based on the first relationship and the plurality of rules to determine the second tag, the second attribute, and the second relationship.

12. The non-transitory computer-readable medium of claim 9, wherein the processor is further configured to:
    determine a new set of rules different from the plurality of rules, wherein the new set of rules are determined in response to determining that a memory of the device has space to store the new set of rules.

13. The non-transitory computer-readable medium of claim 9, wherein the processor is further configured to:
    determine each rule of the plurality of rules based on at least one of: a name matching, a containment, an attribute, and a relationship associated with the device.

14. The non-transitory computer-readable medium of claim 9, wherein the processor is further configured to:

select the at least one of: the first tag, the first attribute, and the first relationship from an object model of the device, wherein the object model comprises a plurality of objects, and wherein each object of the plurality of objects comprises an associated tag of the plurality of tags and an associated relationship of the plurality of relationships.

15. The non-transitory computer-readable medium of claim 14, wherein the processor is further configured to:
add at least one of a third tag and a third relationship based on a pattern matching on an object name;
add at least one of a fourth tag and a fourth relationship based on other tags defined directly on an object; and
add at least one of a fifth tag and a fifth relationship based on a set of tags defined virtually for all objects in the object model.

16. The non-transitory computer-readable medium of claim 9, wherein the processor is further configured to publish the second tag for reception by the application.

17. A system for deriving device information, the system comprising:
a plurality of devices in a facility, wherein each device of the plurality of devices comprises:
a processor; and
a memory connected to the processor, wherein the memory is configured to store a plurality of tags, a plurality of attributes, a plurality of relationships associated with the device, and a plurality of rules, wherein each rule of the plurality of rules defines a condition to relate at least one tag of the plurality of tags with at least one relationship of the plurality of relationships;
wherein the processor is communicatively coupled to an application and the processor is configured to:
receive a request from the application to obtain device information corresponding to a device from amongst the plurality of devices;
in response to the request, retrieve at least one of: a first tag of a plurality of tags associated with the device, a first attribute of a plurality of attributes associated with the device, and a first relationship of a plurality of relationships associated with the device, wherein the first tag, the first attribute, and the first relationship corresponds to a first information accessible by the application;
apply, by the application, the plurality of rules associated with the device to the at least one of: the first tag, the first attribute, and the first relationship;
determine, by the application, the device information associated with the device, wherein the device information comprises at least one of:
a second tag different from the first tag, a second attribute different from the first attribute, and a second relationship different from the first relationship derived based on the plurality of rules to applied to the first tag, the first attribute, and the first relationship, and wherein the device information is not accessible by the application and is derived from the first information; and
execute, by the application, one or more operations to control the plurality of devices in the facility.

18. The system of claim 17, wherein the application is configured to:
access the plurality of tags, the plurality of attributes, and the plurality of relationships in response to the request; and
transmit the device information to a higher application at a higher level than the application in a hierarchy.

19. The system of claim 17, wherein the application is configured to:
evaluate the first tag and the first attribute based on the first relationship and the plurality of rules to determine the second tag, the second attribute, and the second relationship.

20. The system of claim 17, wherein the processor is further configured to:
determine a new set of rules different from the plurality of rules, wherein the new set of rules are determined in response to determining that the memory of the device has space to store the new set of rules.

* * * * *